US012056097B1

(12) United States Patent
Jian et al.

(10) Patent No.: US 12,056,097 B1
(45) Date of Patent: Aug. 6, 2024

(54) DEPLOYMENT OF INFRASTRUCTURE MANAGEMENT SERVICES

(71) Applicant: Dell Products L.P., Round Rock, TX (US)

(72) Inventors: Vivian Jian, Shanghai (CN); Xiaojun Wu, Shanghai (CN); Haijun Zhong, Shanghai (CN); Muzhar S. Khokhar, Shrewsbury, MA (US); Hongyao Tang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/162,395

(22) Filed: Jan. 31, 2023

(51) Int. Cl.
*G06F 17/30* (2006.01)
*G06F 16/18* (2019.01)

(52) U.S. Cl.
CPC .................................. *G06F 16/18* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 11,800,538 B1* | 10/2023 | Shah | .................... | H04W 72/51 |
| 2019/0377604 A1* | 12/2019 | Cybulski | ............... | G06F 9/5072 |
| 2020/0034459 A1* | 1/2020 | Rabe | .................... | G06F 16/273 |
| 2020/0073876 A1* | 3/2020 | López | .................... | G06F 16/2471 |
| 2020/0151024 A1* | 5/2020 | Ji | ............................. | G06F 9/546 |
| 2020/0201665 A1* | 6/2020 | Panse | ................... | G06F 9/5077 |
| 2020/0201666 A1* | 6/2020 | Aron | ........................ | H04L 67/53 |
| 2020/0218735 A1* | 7/2020 | Nilsson | ................. | G06F 16/958 |
| 2021/0028987 A1* | 1/2021 | Krivenok | ............ | H04L 41/0869 |
| 2021/0089379 A1* | 3/2021 | Aikawa | ............... | G06F 11/1658 |
| 2021/0096878 A1* | 4/2021 | Chomakov | ........... | G06F 9/5027 |
| 2021/0136147 A1* | 5/2021 | Giassa | ............... | H04L 67/1031 |
| 2021/0278986 A1* | 9/2021 | Yamamoto | ........... | G06F 9/45558 |
| 2021/0314385 A1* | 10/2021 | Pande | .................... | H04L 41/042 |
| 2021/0392038 A1* | 12/2021 | Zhang | ..................... | G06F 9/547 |
| 2021/0392041 A1* | 12/2021 | Ranjan | ..................... | G06F 8/61 |
| 2022/0006837 A1* | 1/2022 | Crabtree | ............. | G06F 16/2477 |
| 2022/0014555 A1* | 1/2022 | Crabtree | ............. | G06Q 10/103 |
| 2022/0035695 A1* | 2/2022 | Hara | .................... | G06F 11/0751 |
| 2022/0043703 A1* | 2/2022 | Hwang | ................. | G06T 11/206 |
| 2022/0156116 A1* | 5/2022 | Yardeni | .................... | G06F 3/061 |
| 2022/0179660 A1* | 6/2022 | Grehan | .................... | G06F 1/30 |
| 2022/0179716 A1* | 6/2022 | Russell | ................ | G06F 9/5077 |
| 2022/0189615 A1* | 6/2022 | Yu | ........................ | G06F 11/0709 |
| 2022/0237194 A1* | 7/2022 | Patel | ..................... | G06F 16/26 |
| 2022/0342707 A1* | 10/2022 | Alagna | ............... | H04L 67/1008 |
| 2022/0344049 A1* | 10/2022 | Hall | ..................... | G06N 3/0464 |
| 2023/0008011 A1* | 1/2023 | Nair | ..................... | H04L 47/726 |
| 2023/0030000 A1* | 2/2023 | Sinha | .................. | G06F 9/45558 |
| 2023/0039584 A1* | 2/2023 | Luo | ......................... | H04L 63/02 |

(Continued)

*Primary Examiner* — Hung D Le

(74) *Attorney, Agent, or Firm* — Jackson Walker L.L.P.

(57) ABSTRACT

An information handling system may include at least one processor and a memory. The information handling system may be configured to: receive an instruction to join an information handling system cluster; deploy at least one prerequisite service from the information handling system to the information handling system cluster; and cause a master node of the information handling system cluster to join the information handling system to the information handling system cluster.

18 Claims, 2 Drawing Sheets

(56) References Cited

U.S. PATENT DOCUMENTS

| | | | |
|---|---|---|---|
| 2023/0070159 A1* | 3/2023 | Díaz López | G06F 16/2423 |
| 2023/0107301 A1* | 4/2023 | Moradi | H04L 41/30 |
| | | | 706/12 |
| 2023/0113718 A1* | 4/2023 | Khanna | H04L 67/1044 |
| | | | 700/276 |
| 2023/0123303 A1* | 4/2023 | Patil | G06F 21/577 |
| | | | 718/104 |
| 2023/0128753 A1* | 4/2023 | Bawa | G06F 8/20 |
| | | | 717/176 |
| 2023/0164215 A1* | 5/2023 | Velamala | H04L 43/0817 |
| | | | 709/226 |
| 2023/0267226 A1* | 8/2023 | Balinsky | G06F 21/604 |
| | | | 726/27 |
| 2023/0325383 A1* | 10/2023 | Kokenes | G06F 9/451 |
| | | | 707/722 |
| 2023/0342658 A1* | 10/2023 | Tripathi | G06F 9/5072 |
| 2023/0353635 A1* | 11/2023 | Karumbunathan | H04L 67/1097 |

\* cited by examiner

DEPLOYMENT OF INFRASTRUCTURE MANAGEMENT SERVICES

TECHNICAL FIELD

The present disclosure relates in general to information handling systems, and more particularly to techniques for management of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation of hardware resources such as memory, central processing unit time, disk space, and input and output devices, and provide an interface between such hardware resources and application programs hosted by the guest operating system.

In the field of cloud-native computing, a cloud microservice management system such as Kubernetes (K8S) is sometimes used to manage deployments. For the sake of concreteness and exposition, this disclosure will discuss in detail the example of a Kubernetes cluster. One of ordinary skill in the art with the benefit of this disclosure will appreciate its applicability to other implementations.

As the workload of a cloud computing cluster grows, it may become desirable to extend the cluster with one or more on-premises worker nodes. This generally requires provisioning a new node with whatever software components (e.g., microservices) it needs, and then adding it to the cluster.

Traditionally, this has also required manually deploying certain prerequisite services to the existing cluster. In the example of a Kubernetes cluster, these services may include custom resource definition (CRD), Controller, Events, and Upgrade services. These services may enable the cloud cluster to integrate an on-premises node, communicate with an on-premises management controller, etc. After these prerequisite services have been deployed, the cloud-based cluster master may then be instructed to add the new on-premises worker node.

It would be advantageous to be able to add an on-premises worker node to a cloud cluster by interacting only with the new on-premises node, instead of manually setting up prerequisites by communicating with the master node. Embodiments of this disclosure enable such a fully automatic and zero-touch solution.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of information handling systems may be reduced or eliminated.

In accordance with embodiments of the present disclosure, an information handling system may include at least one processor and a memory. The information handling system may be configured to: receive an instruction to join an information handling system cluster; deploy at least one prerequisite service from the information handling system to the information handling system cluster; and cause a master node of the information handling system cluster to join the information handling system to the information handling system cluster.

In accordance with these and other embodiments of the present disclosure, a method may include an information handling system receiving an instruction to join an information handling system cluster; the information handling system deploying at least one prerequisite service from the information handling system to the information handling system cluster; and the information handling system causing a master node of the information handling system cluster to join the information handling system to the information handling system cluster.

In accordance with these and other embodiments of the present disclosure, an article of manufacture may include a non-transitory, computer-readable medium having computer-executable instructions thereon that are executable by a processor of an information handling system for: receiving an instruction to join an information handling system cluster; deploying at least one prerequisite service from the information handling system to the information handling system cluster; and causing a master node of the information handling system cluster to join the information handling system to the information handling system cluster.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
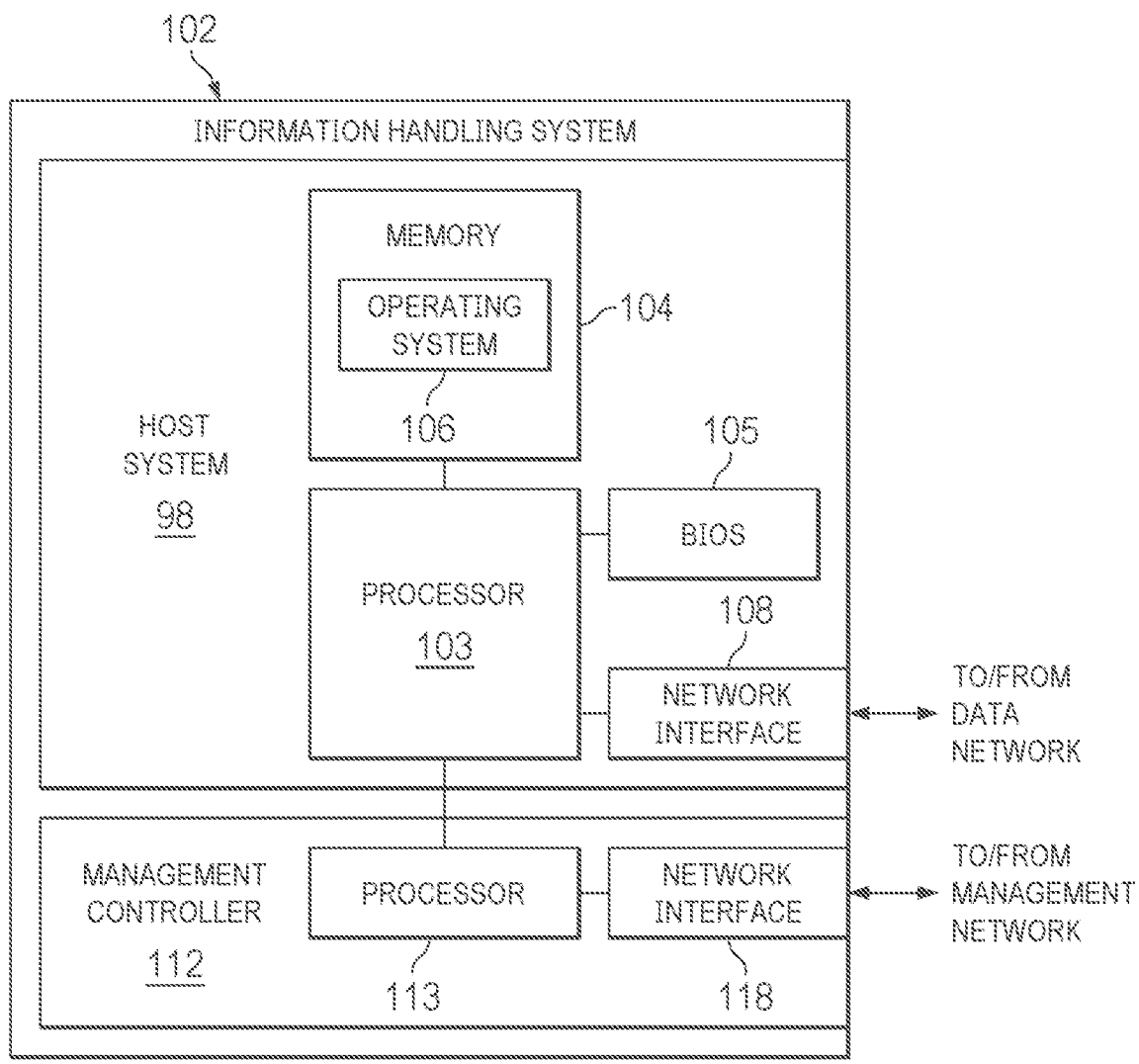
FIG. 1 illustrates a block diagram of an example information handling system, in accordance with embodiments of the present disclosure.
Figure 2:
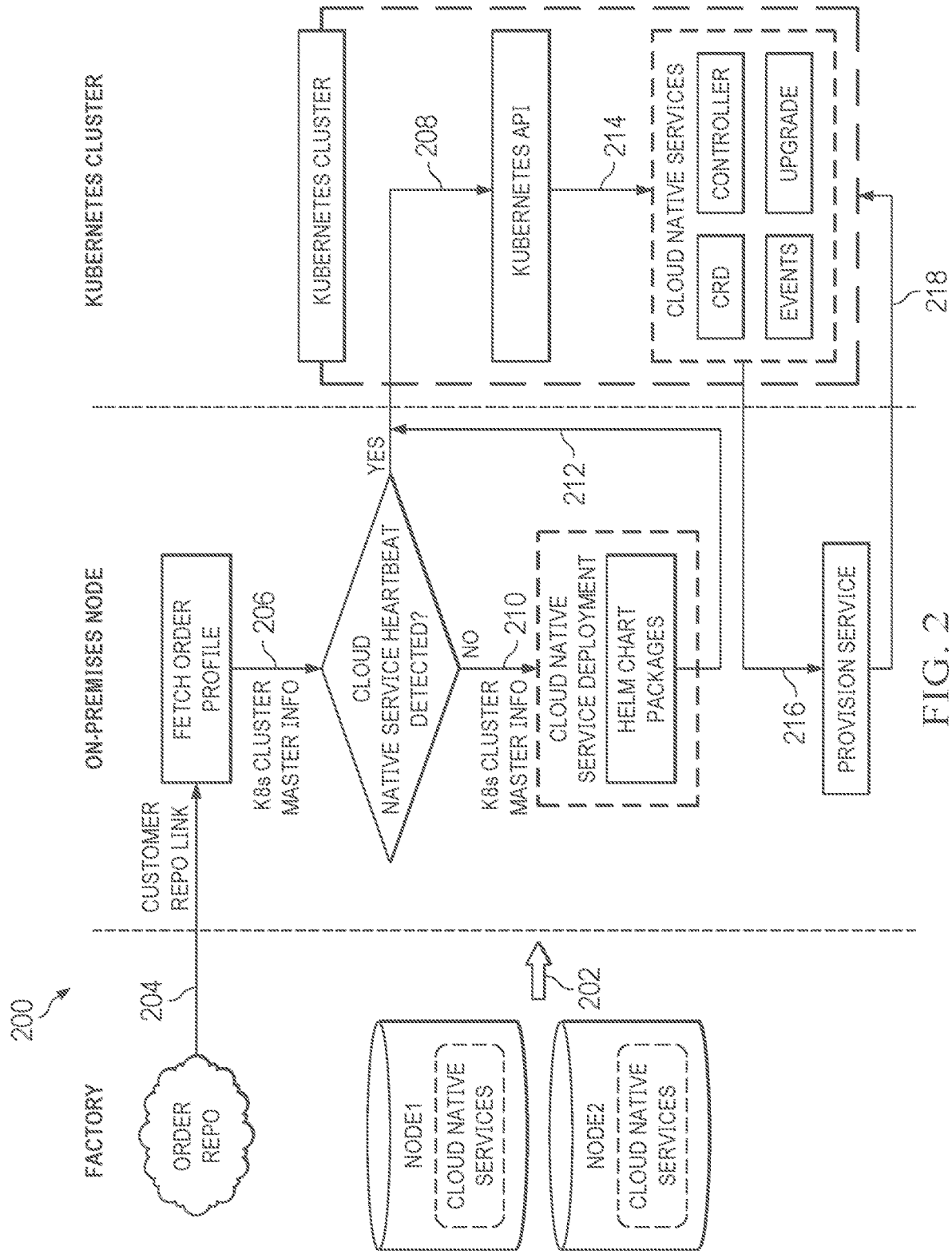
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and in may vary size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media storing for data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in management of information handling systems 102 (e.g., nodes of an HCI system). It should be noted that while the scenario of adding an on-premises node to a cloud-based cluster is discussed in detail herein for the sake of concreteness, other embodiments are also specifically contemplated within the scope of this disclosure.

In particular, embodiments allow for joining an on-premises node such as information handling system to an existing cluster (e.g., a cloud-based cluster such as a Kubernetes cluster). In order to ensure that the necessary prerequisite services (e.g., infrastructure management services that allow integration of the new on-premises node) are present on the cluster, these services may be delivered with the new physical node. The new node may be instructed to add itself to the cluster, and it may deploy those services from itself to the cluster without an administrator needing to perform any manual interaction with the cluster master.

In one embodiment, infrastructure management services, a provisioning service, and a deployment controller service may be included on a storage resource of information handling system 102 at the factory. When information handling system 102 is delivered to a customer datacenter and first powered on, the deployment controller service may first detect whether the infrastructure management services already exist at the target cluster. If not, it may deploy the infrastructure management services to the cluster.

After the infrastructure management services are installed and detected to be operational, the deployment controller service may start the provisioning service to set up information handling system 102 as a customized on-premises cluster node and then add it to the cluster.

Turning now to FIG. 2, an example method 200 is shown for deploying infrastructure management services from an on-premises node to a cluster. Method 200 may begin when the factory environment receives an order from a customer for a new information handling system that will be joined as a node to a Kubernetes cluster.

At step 202, the factory may build the information handling system and include the necessary cloud-native services (e.g., infrastructure management services) on a storage resource of the system. In one embodiment, a tool such as Helm may be used for deployment of these services as Helm chart packages.

At step 204, the customer has received the information handling system and powered it on. The information handling system may then execute a "fetch order profile" module, which may auto-detect the network configuration at the customer's datacenter communicate with the factory to request the customer's private repository link. This may allow the information handling system to retrieve information regarding the Kubernetes cluster's master node, such as the IP address, token, etc.

At step 206, the deployment controller service may determine whether the necessary cloud-native services (e.g., infrastructure management services) already exist on the cluster by attempting to detect heartbeat information from the services. If so, there is no need to re-deploy the services, and the method proceeds at step 208.

If no heartbeat is detected, the method proceeds to step 210 to execute a "Cloud Native Service Deployment" module. At step 212, this module may connect to the Kubernetes cluster and use a deployment tool such as Helm to apply a Helm chart of infrastructure management services to the cluster. The Kubernetes API may then deploy the cloud native services on the cluster at step 214.

The cloud native services call a provision service on the new node at step 216, and the node is added to the cluster at step 218.

One of ordinary skill in the art with the benefit of this disclosure will understand that the preferred initialization point for the method depicted in FIG. 2 and the order of the steps comprising the method may depend on the implementation chosen. In these and other embodiments, the method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   receive an instruction to join an information handling system cluster;
   deploy at least one prerequisite service from the information handling system to the information handling system cluster; and
   cause a master node of the information handling system cluster to join the information handling system to the information handling system cluster.

2. The information handling system of claim 1, wherein the information handling system cluster is a hyper-converged infrastructure (HCI) system.

3. The information handling system of claim 1, wherein the information handling system is an on-premises information handling system located at a datacenter, and wherein the information handling system cluster is a cloud-based cluster that is not located at the datacenter.

4. The information handling system of claim 1, wherein the instruction to join the information handling system cluster is received from a user, and wherein the master node does not receive an instruction from the user relating to the joining of the information handling system to the information handling system cluster.

5. The information handling system of claim 1, wherein the information handling system includes a management controller configured to provide out-of-band management of the information handling system.

6. The information handling system of claim 5, wherein the at least one prerequisite service is configured to allow the master node to communicate with the management controller.

7. A method comprising:
   an information handling system receiving an instruction to join an information handling system cluster;
   the information handling system deploying at least one prerequisite service from the information handling system to the information handling system cluster; and
   the information handling system causing a master node of the information handling system cluster to join the information handling system to the information handling system cluster.

8. The method of claim 7, wherein the information handling system cluster is a hyper-converged infrastructure (HCI) system.

9. The method of claim 7, wherein the information handling system is an on-premises information handling system located at a datacenter, and wherein the information handling system cluster is a cloud-based cluster that is not located at the datacenter.

10. The method of claim 7, wherein the instruction to join the information handling system cluster is received from a user, and wherein the master node does not receive an instruction from the user relating to the joining of the information handling system to the information handling system cluster.

11. The method of claim 7, wherein the information handling system includes a management controller configured to provide out-of-band management of the information handling system.

12. The method of claim 11, wherein the at least one prerequisite service is configured to allow the master node to communicate with the management controller.

13. An article of manufacture comprising a non-transitory, computer-readable medium having computer-executable instructions thereon that are executable by a processor of an information handling system for:
   receiving an instruction to join an information handling system cluster;
   deploying at least one prerequisite service from the information handling system to the information handling system cluster; and
   causing a master node of the information handling system cluster to join the information handling system to the information handling system cluster.

14. The article of claim 13, wherein the information handling system cluster is a hyper-converged infrastructure (HCI) system.

15. The article of claim 13, wherein the information handling system is an on-premises information handling system located at a datacenter, and wherein the information handling system cluster is a cloud-based cluster that is not located at the datacenter.

16. The article of claim 13, wherein the instruction to join the information handling system cluster is received from a user, and wherein the master node does not receive an instruction from the user relating to the joining of the information handling system to the information handling system cluster.

17. The article of claim 13, wherein the information handling system includes a management controller configured to provide out-of-band management of the information handling system.

18. The article of claim 17, wherein the at least one prerequisite service is configured to allow the master node to communicate with the management controller.

\* \* \* \* \*

UNITED STATES PATENT AND TRADEMARK OFFICE
CERTIFICATE OF CORRECTION

PATENT NO. : 12,056,097 B1
APPLICATION NO. : 18/162395
DATED : August 6, 2024
INVENTOR(S) : Jian et al.

Page 1 of 1

It is certified that error appears in the above-identified patent and that said Letters Patent is hereby corrected as shown below:

In the Specification

In Column 1, Line 36, delete "(HC1)" and insert -- (HCI) --, therefor.

In Column 1, Line 42, delete "HC1" and insert -- HCI --, therefor.

In Column 1, Line 44, delete "HC1" and insert -- HCI --, therefor.

In Column 1, Line 45, delete "HC1" and insert -- HCI --, therefor.

In Column 1, Line 46, delete "HC1" and insert -- HCI --, therefor.

In Column 1, Line 47, delete "HC1" and insert -- HCI --, therefor.

In Column 1, Line 51, delete "HC1" and insert -- HCI --, therefor.

In Column 3, Line 40, delete "and in may vary size" and insert -- and may vary in size --, therefor.

In Column 4, Line 39, delete "media storing for data" and insert -- media for storing data --, therefor.

In Column 5, Line 66, delete "HC1" and insert -- HCI --, therefor.

In the Claims

In Column 7, Line 64, Claim 2, delete "HC1" and insert -- HCI --, therefor.

In Column 8, Line 29, Claim 8, delete "HC1" and insert -- HCI --, therefor.

In Column 8, Line 62, Claim 14, delete "HC1" and insert -- HCI --, therefor.

Signed and Sealed this
Twenty-second Day of October, 2024

Katherine Kelly Vidal
*Director of the United States Patent and Trademark Office*